United States Patent
Salsburg et al.

[11] Patent Number: 5,487,638
[45] Date of Patent: Jan. 30, 1996

[54] APPARATUS AND METHOD FOR LOADING ROLLS OF WEB INTO A CHAMBER

[75] Inventors: Fredric S. Salsburg, Victor; Matthew D. Fairbrother, Caledonia, both of N.Y.

[73] Assignee: Eastman Kodak Company, Rochester, N.Y.

[21] Appl. No.: 139,377

[22] Filed: Oct. 20, 1993

[51] Int. Cl.[6] .................................. B65G 59/02
[52] U.S. Cl. .................. 414/796.9; 414/626; 414/648; 414/744.7; 414/782; 414/908; 414/910
[58] Field of Search .............. 294/93, 158; 414/591, 414/626, 744.7, 782, 786, 796.9, 908, 910, 648, 654, 655, 656, 665, 666, 667

[56] References Cited

U.S. PATENT DOCUMENTS

| | | | |
|---|---|---|---|
| 2,551,011 | 5/1951 | Kantor | 414/744.7 X |
| 3,809,423 | 5/1974 | Gazuit | 294/97 X |
| 4,195,961 | 4/1978 | Waiblinger | 414/796.9 X |
| 4,441,662 | 4/1984 | Seragnoli | 242/58 |
| 4,687,244 | 8/1987 | Cullen et al. | 294/93 X |
| 4,708,574 | 11/1987 | Conboy et al. | 414/908 X |
| 4,773,810 | 9/1988 | Nishimura et al. | 414/908 X |
| 4,927,090 | 5/1990 | Matsumoto | 242/67.1 R |
| 4,941,798 | 7/1990 | Meier | 414/910 X |
| 5,249,757 | 10/1993 | Draghetti et al. | 242/58.6 |

*Primary Examiner*—Frank E. Werner
*Assistant Examiner*—Janice L. Krizek
*Attorney, Agent, or Firm*—Charles E. Snee, III; Clyde E. Bailey, Sr,

[57] ABSTRACT

An apparatus (10) for loading a roll of web (1) from a stack (3) along a first axis (7) into a chamber (2) along a second axis (8) has a pivotable support member (12) and an engaging means (16) having a head member (18) attached to the support member (12) for engaging a roll along the first axis (7) and guiding the roll (1) into the chamber (4) along the second (8). The support member (12) pivots between a first position in alignment with the stack (3) along the first axis (7) and, a second position in alignment with the chamber opening (4) along the second axis (8). A guide means (22) comprising a guide track (24) having first and second elevation positions and predetermined first, second and third stopping means (30), (53), (44) are provided to ensure that the engaging means (16) precisely and repeatedly locates at the desired positions.

5 Claims, 4 Drawing Sheets

APPARATUS AND METHOD FOR LOADING ROLLS OF WEB INTO A CHAMBER

FIELD OF THE INVENTION

The invention relates to an apparatus and method for loading objects into containers. More particularly, the invention concerns an apparatus and method for loading rolls of photographic web from a stack into a chamber within a container for photographic web,

BACKGROUND OF THE INVENTION

Packages or containers that provide photographic web to photofinishing equipment must be periodically loaded with photographic web either by the photofinisher or by the photographic web manufacturer. Conventional apparatus and methods for loading rolls of web, such as photographic paper, into chambers within packages or containers operate in tandem with the manufacturer's web slitter operation. In this operation, once the web is slit it exits the slitter operation having a horizontal orientation. The slit web, while horizontal, is transferred to a "gin pole" or shaft and the "gin pole" is lowered to a height that corresponds to the height of the chamber opening. The slit webs are then pushed from the "gin pole" into the chamber. Thus, existing apparatus is designed to load photographic paper into chambers from the manufacturer's slitter operation and at a photofinisher's location.

One shortcoming of the present apparatus for loading packaging chambers, such as the packaging described in U.S. application Ser. No. 952,897, filed Nov. 20, 1992, now U.S. Pat. No. 5,383,591, and based on priority French application No. 9007375 filed Jun. 8, 1990, is that the package could not be conveniently loaded by the photofinishers. Instead, because existing apparatus for loading photographic paper is rather cumbersome, the photofinisher has to return the package chamber, once the paper supply is exhausted, to the photographic paper manufacturer for reloading. This practice, of course, results in undesirable photofinishing equipment and processing downtime, excessive shipping cost accruing to both the manufacturer and the photofinisher, and the additional cost to the photofinisher for the convenience of preloaded packages.

One prior art apparatus for loading a package container known to the inventors is described in U.S. application Ser. No. 129,889, filed 30 Sep. 1993, now U.S. Pat. No. 5,390,872. Generally the apparatus includes a roll support shaft that is preloaded with rolls of web via a hoist. The entire affair is then inserted into the package chamber which interfaces with photofinishing equipment. While this apparatus works well for the top loaded package container described in the application, it would not be suited for a variety of package chamber configurations as the present invention. Moreover, the apparatus described in the application requires considerably more labor support to operate and, it is far more expensive to manufacture.

Therefore, a need persists for an apparatus and method for loading rolls of photographic paper into a packaging chamber that is convenient to use, of simple construction, economical and easy to manufacture, compact, and easy to operate by the photofinisher.

SUMMARY OF THE INVENTION

It is, therefore, an object of the invention to provide an apparatus and method that overcome the problems of the prior art. Accordingly, for solving one or more of the above problems, in one aspect of the invention, an apparatus is provided for loading a roll of web having a central opening with an interior wall from a stack having a first axis into a chamber having a second axis transverse to the first axis. The apparatus may comprise a support member pivotable between a first position in alignment with the stack along the first axis, to a second position in alignment with the chamber along the second axis. Engaging means rotatably mounted to the support member is provided for firmly engaging at least one roll along the first axis and delivering the roll to the chamber along the second axis.

Moreover, yet another solution to the above problems is provided by a system for loading a roll of web, as described above, from a stack into a chamber. A fixed frame member has a support member pivotably connected to the frame member. The support member is pivotable between a first position in alignment with the stack of rolls of web and a second position in alignment with the chamber. In this embodiment, an engaging means rotatably mounted to the support member is provided for engaging at least one roll and delivering the roll to the chamber. Moreover, a first means is provided for precisely positioning and securing the stack of rolls of web. Preferably, the first positioning means comprises a first enclosure for restricting the movement of the stack along the first axis. Similarly, a second means is provided for precisely positioning and securing the package or container from movement during loading. Preferably, the second means comprises a second enclosure at least partially surrounding the package or container.

In still another embodiment of the invention, a solution to the above problems is provided by a method for loading a roll of web, as described above, from a stack into a chamber having a spindle for receiving the roll comprising the step of providing an apparatus having a rotatable extending head member for engaging a roll of web, as described above. The head member is centered with the central opening of the top most roll in the stack along the first axis. After centering, the head member is lowered into the central opening of the top most roll in the stack. An engaging means is then activated that securely engages the interior wall of the central opening thereby locking the roll to the head member. Following the roll locking step, the head member with a roll of web locked thereon is raised first upwardly along the first axis away from the stack. The head member with the roll locked thereon is then guided into alignment with the chamber along the second axis. Once aligned with the chamber, the roll is then inserted therein by first releasing the roll of web from the head member and then pushing the roll into sliding contact with a spindle inside the chamber. After the roll is loaded onto the spindle, the head member is moved away from the chamber and then back into position to engage another roll in the stack along the first axis.

BRIEF DESCRIPTION OF THE DRAWING

The foregoing as well as other objects, features and advantages of this invention will become more apparent from the appended Figures, wherein like reference numerals denote like elements, and wherein.

DETAILED DESCRIPTION OF THE INVENTION

Figure 1:
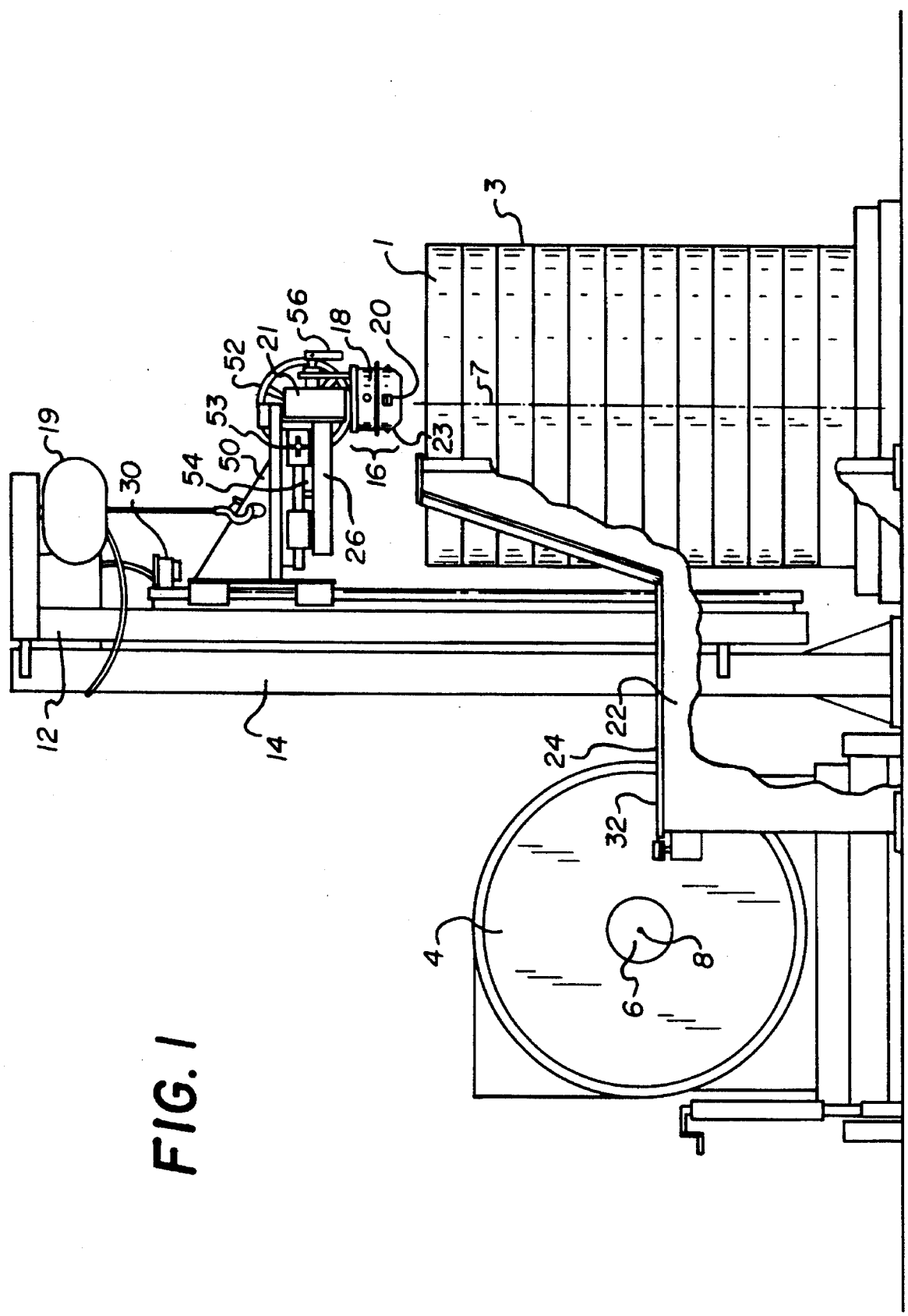
FIG. 1 is a front elevation view, partially broken away, of the apparatus of the invention with the lifting head raised and positioned in alignment with a stack of rolls.
Figure 2:
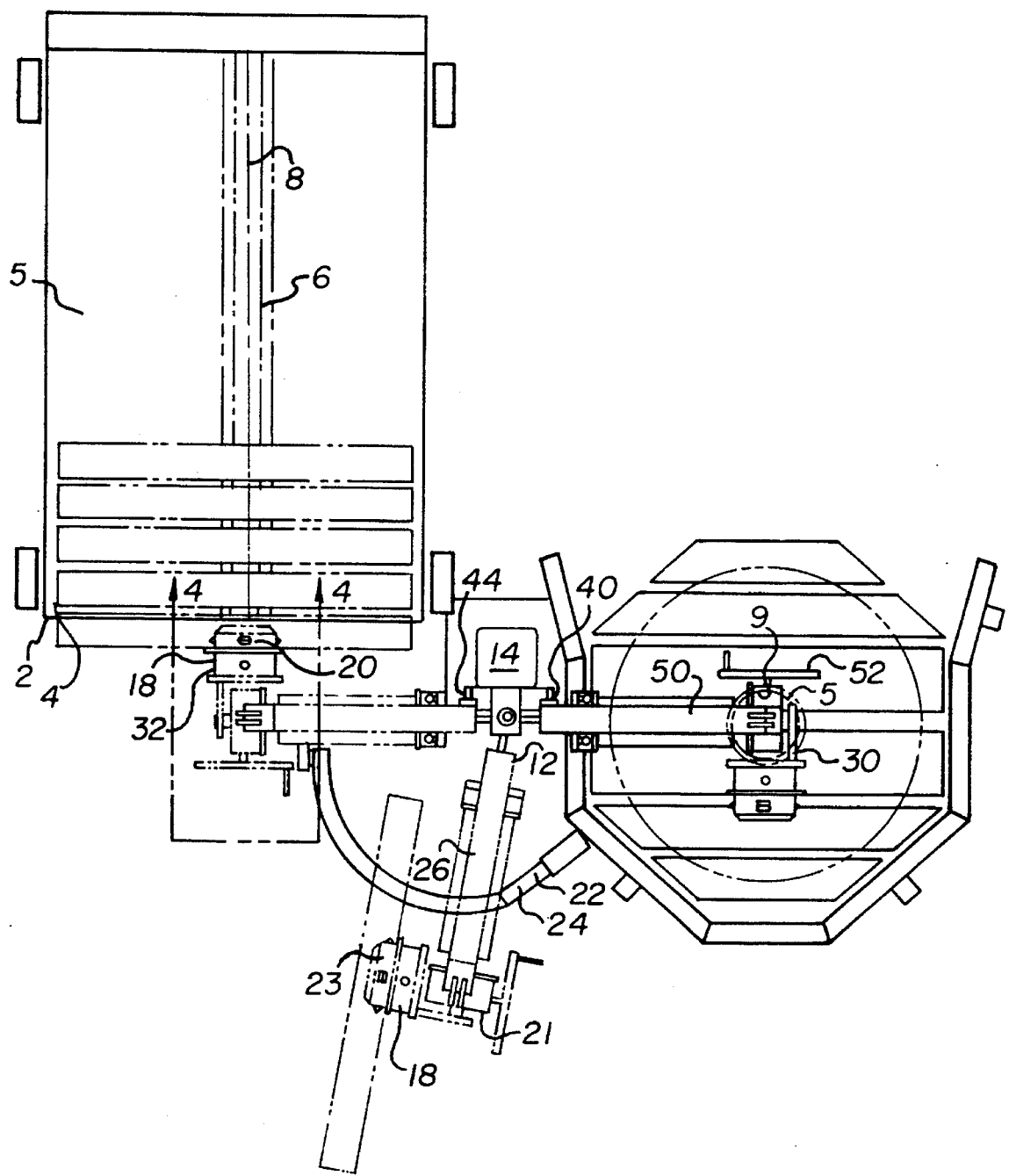
FIG. 2 is a top plan view showing the lifting head in three positions as the roll of web (a) is lifted, (b) is guided from the stack and (c) is moved into the chamber.
Figure 3:
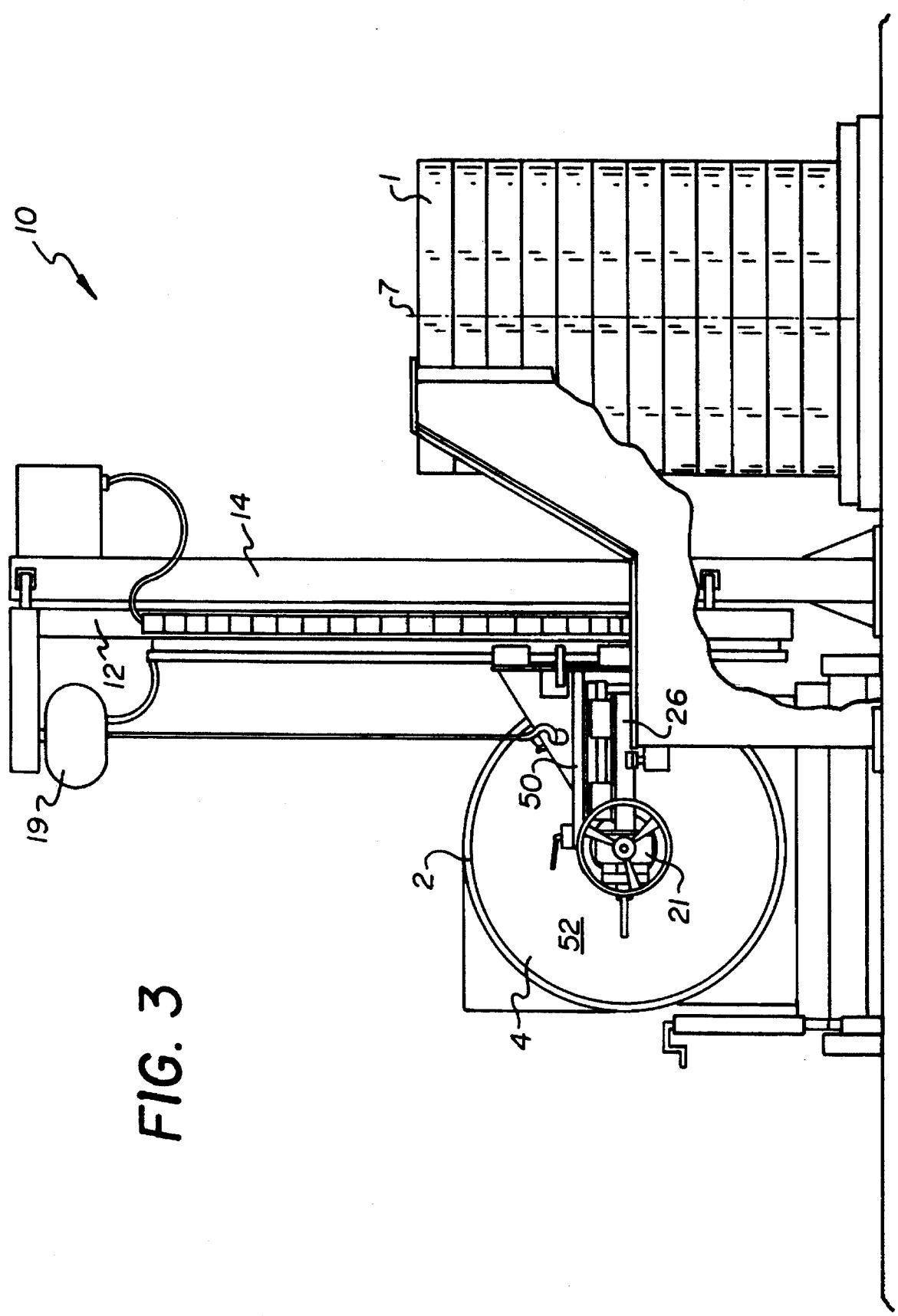
FIG. 3 is a front elevation view of the apparatus with the lifting head lowered and positioned in alignment with the container.

Turning now to the drawings, and more particularly to FIGS. 1–3, there is shown the apparatus 10 for loading rolls of web 1, such as photographic paper, from a stack 3 into a chamber 4 of package 2, such as the package described in U.S. application Ser. No. 952,897, filed Nov. 20, 1992, and based on priority French application No. 900007375, filed Jun. 8, 1990, in accordance with the principles of the invention. The objects or rolls 1 have a central opening 5 and are arranged in a vertical stack 3 having a first axis 7 near the apparatus 10. The stack 3 typically includes several rolls of web 1 with one roll of web 1 atop the other but, it may include only one roll of web 1. The chamber 4 into which the roll of photographic web 1 is loaded along a spindle 6 defining a second axis 8 transverse to the first axis 7 nominally has an openable end member (not shown) through which the rolls of photographic web 1 enter the chamber 4. The spindle 6 set inside the chamber 4 and accessible through the openable end member provides support for the rolls of photographic web 1 that are loaded therein.

Accordingly, broadly defined, the apparatus 10 of the invention comprises a pivotable support member 12 to which is mounted a means 16 for securely engaging the core of a roll 1, as further described below. In the preferred embodiment, support member 12 is pivotably connected to a fixed frame member 14 attached to the floor or some other suitable stable surface. The frame member 14 provides a reference axis about which the support member 12 pivots. Support member 12 is configured to pivot from a first position in alignment with the stack of rolls along the first axis 7, to a second position in alignment with the chamber 4 along the second axis 8. A pneumatic lift mechanism 19 is provided for raising a head support member 50, which enables a head member 18 to clear the stack 3 after engaging a roll of web 1. A typical lift mechanism preferred by the inventors is one manufactured by D. W. Zimmerman Handling Systems, Madison Heights, Mich., Those skilled in the art will appreciate that the head support member 50 may also be raised by other means, such as by an electrically operated hoist. The pneumatic lift mechanism 19 is used to raise and lower the head support member 50, with and without a roll of web 1 on the head member 18. The head support member 50 provides a means to support, and connect, the head member 18 to the support member 12.

The engaging means 16 comprises a rotatable extending head member 18. At least two retractable gripping members 20 are mounted in a peripheral wall 23 of the head member 18 for engaging the interior wall 9 of the central opening 5 of at least one roll 1 in the stack 3. Preferably four spaced retractable gripping members 20 are positioned about the head member 18 for securely gripping and delivering the roll of web 1 into the chamber 4. A core engaging device preferred by the inventors is one manufactured by Tilt-Lock, Inc. of Columbia Hts., Mn.

Figure 4:
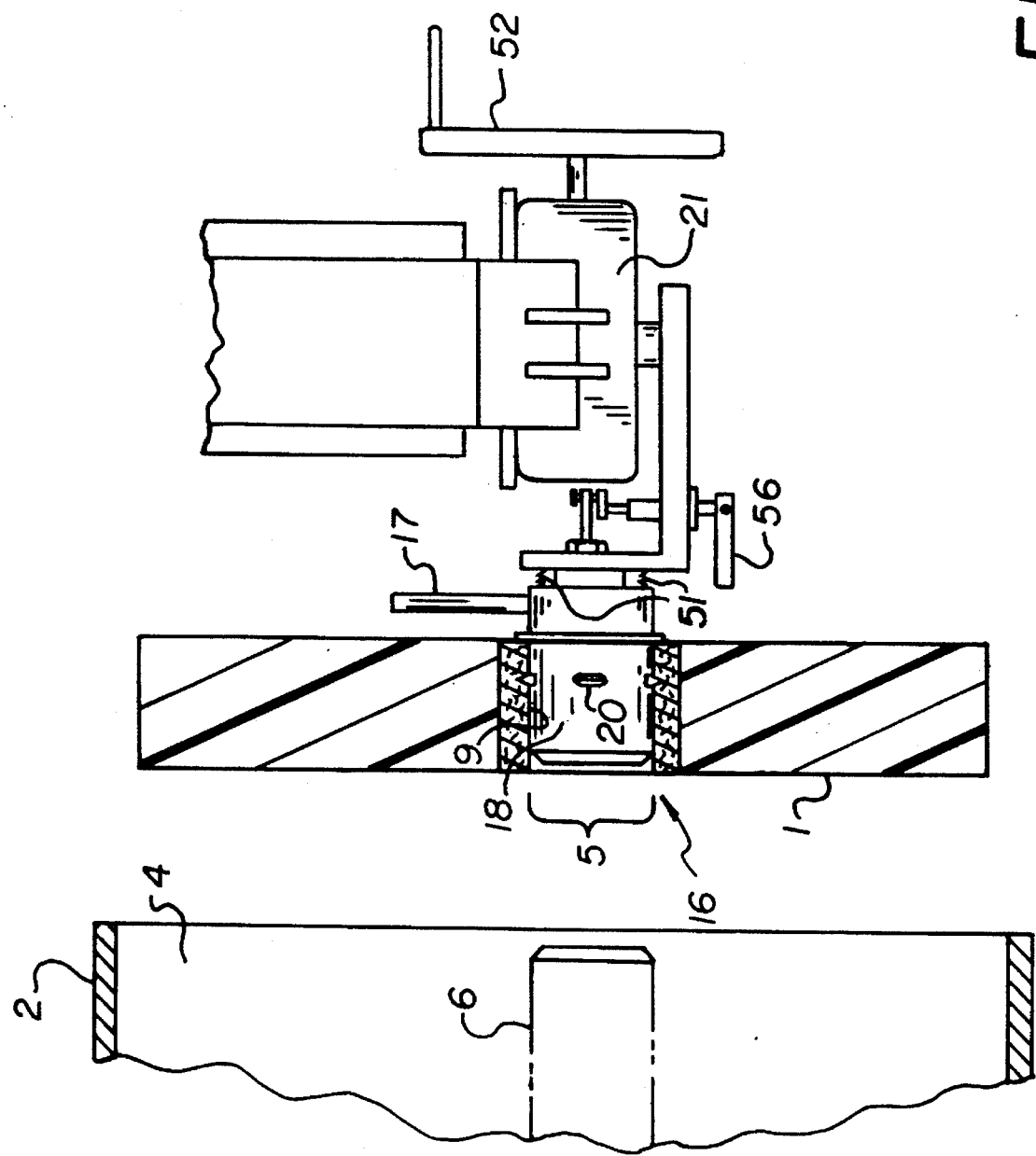
FIG. 4 is a fragmentary, partially sectional top view of the apparatus along line 4—4 of FIG. 2, showing the lifting head member and the retractable members engaging the roll core.

According to FIG. 4, the extending head member 18 is inserted into the central opening 5 of the roll 1 and the retractable gripping members 20, when activated, are lodged into the interior wall 9, thereby gripping the central opening 9 and, therefore, the roll 1 in a secure manner. Retractable gripping members 20 or "teeth" operate by both gravity and bias springs 51. When the gripping members 20 are inserted into the interior wall 9 of the central opening 5 (FIG. 4), a light spring pressure is applied to the gripping members 20 that engages them into the interior wall 9. As the head member 18 is pulled away from the central opening 5 along the first axis 7, the gripping members 20 penetrate deeper into the interior wall 9 thereby providing secured attachment to the central opening 5 of the roll 1. Release handle or member 56 enables the operator to disengage the gripping members 20 from the interior wall 9 when unloading the roll 1 onto the spindle 6 in chamber 4. The head member 18 is preferably substantially cylindrical and has a diameter slightly less than the diameter of the central opening 5 so as to facilitate engagement and securement of the roll 1. Rotation of the head member 18 is achieved by a gear box 21. A gear box 21, preferably one manufactured by Dyna-Torque Corp. of Muskegon, Mich., is used to rotate the roll web 1 away from the first axis 7 of the vertical stack 3 to a horizontal position, so that it can be inserted onto the fixed spindle 6 along the second axis 8 of the chamber 4. This operation of rotating the roll of web 1 from a vertical to horizontal position, is preferably performed approximately half way between the first axis 7 of the vertical stack 3 and the second axis 8 of chamber 4, as shown in FIG. 2. Rotation is accomplished by turning the handle 52 attached to the gear box 21. Those skilled in the art will appreciate that this latter maneuver can also be performed with an electrically driven device. Alternatively, skilled artisans will appreciate that other engaging means 16 would satisfy the requirements of the present invention including a pneumatic expandable spindle, a cam activated device, and a threaded expandable spindle (none illustrated).

In FIG. 2, the apparatus 10 is shown with the support member 12 having a roll of web 1 secured to the head member 18, in the manner described above, lifted away from the stack 3 along the first axis 7 and pivoting toward and into alignment with the chamber 4 along the second axis 8. In this illustration, the roll 1 is shown being rotated from a horizontal position in the stack 3 to a substantially vertical position as it approaches and aligns with the chamber 4 along the second axis 8. While not necessary in the preferred embodiments a guide means 22 comprising a guide track 24 is positioned so as to provide continuous riding contact for a follower member 26 fixed to the head support member 50. This arrangement enables the engaging means 16 to travel between a first elevational position against a stop means 30 above the stack 3, to a second elevational position 32 on track 24, in alignment with the chamber opening.

Referring again to FIGS. 1 and 2, frame member 14 is shown having four stopping means 30,53,40,44 for the apparatus as it pivots between the stack along the first axis 7 and into the chamber 4 along the second axis 8. First stopping means 30 limits upward movement of head support member 50 when the head member 18 is in alignment with the first axis 7 of the stack 3. Stopping means 53 limits transverse movement of the head member 18 relative to the central openings 5 of the rolls 1 in stack 3. Thus, when the support member 12 swings away from the first axis 7 and then returns, it will precisely and repeatedly align with the central openings 5 of the remaining rolls 1 in the stack 3. Third and fourth stopping means 40, 44 precisely and repeatedly position the support member 12 rotationally when the head member 18 is in alignment with the first axis 7 or with the second axis 8 of the chamber 4.

As shown in FIG. 1, the head member 18 and gear box 21 are mounted on a slide 54. This slide 54 allows the operator to accurately position the head member 18 into the central opening 5 of the roll 1 of web 1 in the stack 3 and "lock" its pick-up position at the stack 3 by means of a clamp on a pneumatic cylinder (not shown). The slide 54 also allows the head member 18 to be automatically positioned, by the pneumatic cylinder, at the chamber 4 for loading the roll of web 1 onto the spindle 6 in the chamber 4. Once this "pick-up" position is established at the stack 3 along the first axis 7, the remaining rolls of web 1 in the stack 3 can be located automatically by using the pneumatic cylinder. A preferred cylinder is one manufactured by Chicago Cylinder Corp. of Chicago, Ill. This feature compensates for any misalignment of the rolls of web 1 in the stack 3 caused in shipping of the stack 3 to the photofinisher, or its placement in the apparatus In another embodiment of the invention, a method for loading a roll of web 1 from a stack 3 into a chamber 4 having a spindle 6 for receiving the roll 1 includes the step of providing apparatus 10, as described above, having a rotatable extending head member 18 for engaging a roll of web 1. The head member 18 is centered along the first axis 7 with the central opening 5 of the top most roll 1 in the stack 3. After centering the head member 18 is lowered into the central opening 5 of the top most roll 1 in the stack 3. An engaging means 16 is then activated that securely engages the interior wall 9 of the central opening 5 of roll 1 thereby locking the roll 1 onto the head member 18. Following the roll locking step, the head member 18 with a roll of web 1 locked thereon is raised first upwardly along the first axis 7 away from the stack 3 with the aid of lift mechanism 19. The head member 18 with the roll 1 locked thereon is then guided into alignment with the chamber 4 along the second axis 8. Once aligned with the second axis 8 of the chamber 4, the roll 1 is then inserted therein by first releasing the roll of web 1 from the head member 18 and then pushing the roll 1 into sliding contact with the spindle 6 inside the chamber 4. After the roll 1 is loaded onto the spindle 6, the head member 18 is moved away along the second axis 8 of the chamber 4 and then back into position to engage another roll 1 in the stack 3 along the first axis 7.

Accordingly, an important advantage of the present invention is that it provides an apparatus 10 and method for loading rolls of photographic web 1 into a chamber 4 that is convenient to use, of simple construction, economical and easy to manufacture, compact and easily operated by the photofinisher.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes for exemplification, but is to be limited only by the scope of the attached claim or claims, including the full range of equivalency to which each element thereof is entitled.

| PARTS LIST | |
|---|---|
| Object or Roll of Web | 1 |
| Container or Package | 2 |
| Stack | 3 |
| Chamber | 4 |
| Central opening of Roll | 5 |
| Spindle | 6 |
| First Axis of Stack | 7 |
| Second Axis of Chamber | 8 |
| Interior Wall of roll | 9 |
| Apparatus | 10 |
| Pivotable Support Member | 12 |
| Engaging Means | 16 |
| Frame Member | 14 |
| Steering Handle | 17 |
| Pneumatic Lift Mechanism | 19 |
| Head Member | 18 |
| Retractable Gripping Members | 20 |
| Gear Box | 21 |
| Guide Mean | 22 |
| Periphery Wall of Head | 23 |
| Guide Track | 24 |
| Follower Member | 26 |
| First Stop Means | 30 |
| Second Elevation Position | 32 |
| Second and Third Stopping Means | 53,44 |
| Fourth Stopping Means | 40 |
| Head Support Member | 50 |
| Biased Spring Means | 51 |
| Handle | 52 |
| Clamp | 53 |
| Slide | 54 |
| Release Handle | 56 |

What we claim is:

1. Apparatus for loading an object from a stack having a first axis into a container having a chamber with a second axis transverse to the first axis, the object including a central opening with an interior wall, said apparatus comprising:

a fixed frame member having a reference axis;

a support member pivotably mounted to said frame member for rotation about said reference axis between a first position at which an object is raised from the stack along said first axis and a second position at which an object is inserted into the chamber along said second axis, and wherein said support member is connected to a follower member;

means for guiding said support member between said first and second positions, said means for guiding comprising a guide track engageable by said follower member, said guide track defining a first elevational position along said first axis and a second elevational position along said second axis;

engaging means rotatably mounted to said support member for firmly engaging the object along said first axis and delivering the object along said second axis into the chamber; and means mounted to said support member for raising and lowering said engaging means along said support member between said first and second positions.

2. The apparatus recited in claim 1 wherein a first stopping means is provided for limiting the elevation of the engaging means along said first axis.

3. The apparatus recited in claim 1 wherein a second stopping means is provided for precisely and repeatedly locating said support member in said first position.

4. The apparatus recited in claim 3 wherein a third stopping means is provided for precisely and repeatedly locating said support member in said second position.

5. The apparatus recited in claim 1, further comprising a slide mounted to said support member, said engaging means being suppported by said slide.